June 6, 1939.  K. SCHARFENBERG  2,161,724

AUTOMATIC CAR COUPLER

Filed March 10, 1937

Inventor:
Karl Scharfenberg
by his attorneys
Howson and Howson

Patented June 6, 1939

2,161,724

UNITED STATES PATENT OFFICE 2,161,724

AUTOMATIC CAR COUPLER

Karl Scharfenberg, Berlin-Nicolassee, Germany

Application March 10, 1937, Serial No. 130,184
In Germany March 10, 1936

2 Claims. (Cl. 213—77)

In the known constructional form of automatic car couplings with hook plates or discs and coupling eyes, the coupling members form a parallelogram. When unlocking the coupling, the friction of the pins at the pivotal points of the parallelogram has to be overcome in addition to the force of the coupling springs.

In the accompanying drawing

Figure 1:
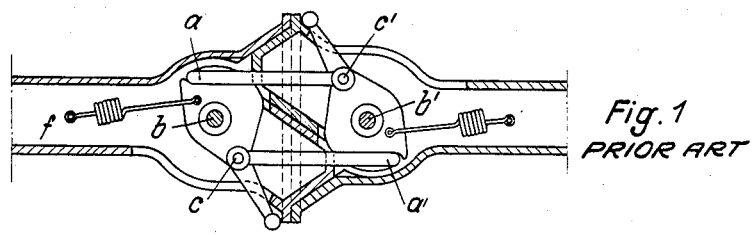
Figure 1 shows in horizontal central section, a coupling of the known constructional form
Figure 2:
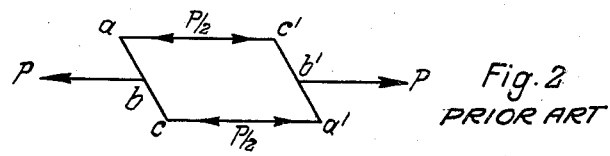
Figure 2 is a diagram of forces relating thereto.

In the known form of coupling, as is apparent from Figure 1, the pivotal points $a$, $b$, $c$ and $a'$, $b'$, $c'$, respectively, lie in parallel straight lines and when the parallelogram is moved about the pivotal points $b$ and $b'$, the lever arms at which the tractive forces P/2 in the coupling eyes act on the hook plates remain equal. Consequently the right handed and the left handed turning moments acting on the hook plates remain unchanged during the uncoupling operation.

Figure 3:
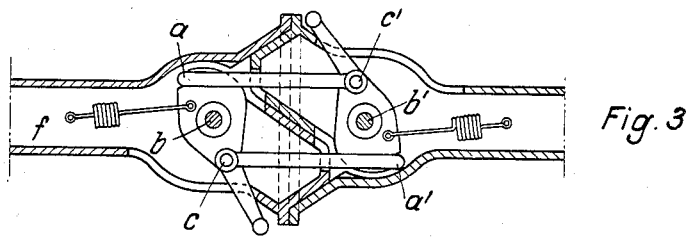
Figure 3 shows likewise in horizontal central section, a coupling according to the present invention, in the locked or coupled condition.
Figure 4:
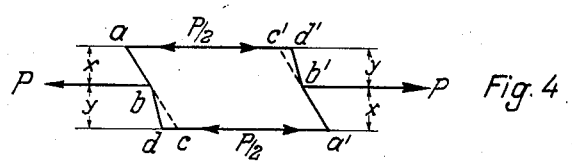
Figure 4 is the diagram of forces relating to the coupling as shown in Figure 3.
Figure 5:
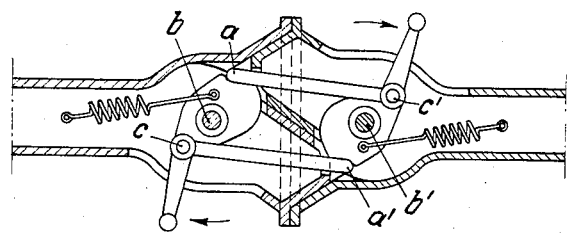
Figure 5 shows the same coupling, according to the invention with its parts in readiness for uncoupling
Figure 6:
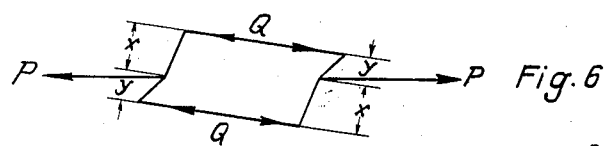
Figure 6 is the diagram of forces corresponding to the conditions shown in Figure 5.

Now the present invention consists in selecting the positions of the pivotal points in an automatic coupling with hook plates and coupling eyes pivoted thereto in such a way that, when the coupling is locked, the lever arms of the points where the coupling eyes pivot on the hook plates are equal in magnitude with respect to the axes of rotation of said hook plates, that when the coupling is unlocked the lever arm $x$ becomes relatively greater than the lever arm $y$. This can be achieved, for instance, as shown in Figure 3, by bringing the pivotal points $b$ and $b'$ on the central axis of the coupling, closer together, while still keeping the lever arms $x$, $y$ of equal magnitude so long as the coupling is in the normal locked condition (see Figure 4). Under these circumstances, the right handed and left handed turning moments still remain equal, so that accidental uncoupling is impossible. When, however, the hook plates are moved out of their normal positions, by rotating them in opposition to the force of the coupling springs $f$ (see Figure 5) so as to permit of uncoupling, the lever arm $x$, at which the hook openings are located, becomes greater than the lever arm $y$, at which the coupling eyes are pivoted to the hook plates (see Figure 6). Thus the tractive forces Q, in the coupling eyes, act on the hook openings with a relatively long lever arm and on the pivots of the said eyes with a relatively short lever arm. The result is that the said tractive forces exert on the hook plates a turning moment in a direction which is such as to promote or facilitate uncoupling.

It is worthy of remark that coupling heads of the previously known construction and coupling heads of the new construction, according to the present invention, work well together if the positions of the pivotal points $a$, $c$ and $a'$, $c'$, remain unchanged and only the pivotal points $b$, $b'$ are brought closer together by reason of one of the two mating coupling heads being designed as herein described. It is therefore, possible to secure the desired ease of uncoupling, characteristic of the new coupling heads, without precluding the cooperation of such heads with other coupling heads of the previously known construction.

I claim:

1. In an automatic coupling, a pair of mating coupling devices each having a rotatable hook plate and a coupling eye pivoted to said plate, the coupling eye of each device engaging with the hook plate of the other device to hold the coupling devices engaged, said coupling eyes being so pivoted and engaged with said plates that the lever arms through which said eyes tend to rotate said plates are equal when said coupling is locked and the lever arms through which said eyes act to rotate said hook plates to unlocked position becoming relatively greater as said coupling is being unlocked than the lever arms through which said eyes tend to rotate said hook plates to locked position.

2. In an automatic coupling, a pair of mating coupling devices each having a rotatable hook plate and a coupling eye pivoted to said plate, the coupling eye of each device engaging with the hook plate of the other device to hold the coupling devices engaged, said coupling eyes being so engaged and connected to said plates that the center of rotation of each hookplate is offset from a line joining the points of rotation of the eyes with respect to said plate in such manner that when the coupling is engaged the lever arms of the forces acting on the longitudinal axes of the eyes and tending to rotate said hook plates are equal, while during the disengagement of the coupling the lever arms of the forces tending to rotate the hookplates to disengaging positions become relatively greater than the lever arms of the forces tending to rotate the hookplates to engaging positions.

KARL SCHARFENBERG.